United States Patent [19]

Del Castillo

[11] Patent Number: 5,040,429

[45] Date of Patent: Aug. 20, 1991

[54] MECHANICAL ELECTRIC MOTOR SYNCHRONIZER

[76] Inventor: Richard A. Del Castillo, HC-01, Box 48-C, Dripping Springs, Tex. 78620

[21] Appl. No.: 628,613

[22] Filed: Dec. 17, 1990

[51] Int. Cl.$^5$ .................................................. F16H 1/14
[52] U.S. Cl. .................................. 74/424; 74/665 M; 901/26
[58] Field of Search ............... 74/412 R, 413, 417, 74/420, 423–424, 385, 665 R, 665 GB, 665 GC, 665 M, 459.5; 318/567, 568.12, 580, 581, 587, 603, 625; 901/1, 25–26

[56] References Cited

U.S. PATENT DOCUMENTS

| | | | |
|---|---|---|---|
| 722,955 | 3/1903 | Donahoe | 74/424 |
| 725,675 | 4/1903 | Collins | 74/424 |
| 852,939 | 5/1907 | Fairman | 74/424 |
| 1,143,537 | 9/1913 | Green | 74/424 |
| 2,126,255 | 8/1938 | Hacker . | |
| 2,203,292 | 6/1940 | Best | 74/424 |
| 3,115,936 | 2/1961 | Blews | 74/665 M |
| 3,119,537 | 1/1964 | Smits | 74/665 M |
| 3,777,854 | 12/1973 | Ozawa | 187/29 R |
| 4,270,408 | 6/1981 | Wagner | 74/665 MX |
| 4,470,284 | 9/1984 | Noe et al. | 74/665 MX |
| 4,678,055 | 7/1987 | Yoshinaka et al. | 74/447 X |

Primary Examiner—William M. Shoop, Jr.
Assistant Examiner—David Martin
Attorney, Agent, or Firm—Gunn, Lee & Miller

[57] ABSTRACT

This invention relates to a synchronous mechanical motor controller for use in robot applications requiring precise and repeatable movements. The synchronous motor controller is an arrangement of separate electric motors driving individual wheels and operating in harmony with each wheel through multiple bevel gear sets having independent servos. A shaft revolution counter allows the robot to learn and repeat its movements. An onboard radio receiver and transmitter allows an operator to remotely teach the robot its movements. The arrangement of electric motors, bevel gear sets, and servos allowing the robot to run straight, turn, or pivot as required and to accurately reverse its steps so as to return to the same point from which it started.

4 Claims, 3 Drawing Sheets

MECHANICAL ELECTRIC MOTOR SYNCHRONIZER

BACKGROUND OF THE INVENTION

1. Field of the Invention

This invention relates to a mechanical electric motor synchronizer for use in robot applications requiring precise and repeatable movements. Specifically, the present invention relates to robotics applications in which the robot is required to repeat precise movements and return to its originating point.

Robots are being used in every phase of modern life. They are being used from the assembly line of automobiles to private homes as waiters and security patrols. However, robot mobility does require means to minimize the complexity and weight of the drive mechanism. It is known in the art for designers to use a separate electric motor with a separate gear reduction system to drive each wheel. Unfortunately, even with precise manufacturing, individual electric motors will not operate identically. Consequently, robots have a tendency to drift left or right as they are moving in a straight line.

2. Description of the Prior Art

Others, outside the robotics field, have tried to synchronize two rotating wheels with no satisfactory solution. Hacker patented a vehicle drive mechanism in U.S. Pat. No. 2,126,255, issued Aug. 9, 1938, in which a combination of bevel gears and clutch mechanisms were used. Hacker discloses a complex arrangement of separate propelling means with hydraulic turbines, hydraulic reverse gears, and a plurality of brakes to operate the separate wheels. The steering wheel engages the friction clutch to make the caterpillar vehicle to run straight or turn. This type of complex system is not useable in robotics applications where there is no steering wheel.

The prior art uses electric speed governors to synchronize a robot's electric drive motors. Each independent wheel has an electronic controller which are electrically connected. The electronic controllers are designed to try and keep the wheels turning at the same torque and rpm. Unfortunately, due to the manufacturing differences in electronic controllers and variances caused by temperature fluctuations and other environmental factors, this type of synchronizer still allows the robot to drift.

Drift becomes a significant problem when a robot is required to reverse its steps and return to its original location. If drift is unaccounted for, it is impossible for the robot to return to its identical location. This problem escalates in tight maneuvering situations where the robot is physically unable to backtrack its steps due to the drift. Thus, it can be seen that the need exists for a synchronizer which will eliminate the drift in robot applications caused by the use of separate electric drive motors.

SUMMARY OF THE INVENTION

A mechanical electric motor synchronizer allowing precise and repeatable movements comprised of separate electrical motors driving individual wheels and operating in harmony with each wheel through interconnected multiple bevel gear sets having independent servos engaging and disengaging the multiple bevel gear sets with a shaft revolution counter allowing the robot to learn and repeat its movements. An onboard radio receiver and transmitter allows an operator to remotely control and teach the robot its maneuvers. The disclosed arrangement of electrical motors, interconnected multiple bevel gear sets, and servos allows a robot to run straight, turn, or pivot as required and to accurately reverse its steps so as to return to the same point from which it started.

It is an object of the present invention to provide a mechanical method of synchronizing electric motors which eliminates manufacturing differences in the electric motors.

Another object of the present invention is to provide a method of synchronizing motors which is not sensitive to temperature, static electricity, and other environmental variations.

A further object of the present invention is to provide a synchronizer for motors which is light weight, reliable, and does not require a separate power source.

Still a further object of the present invention is to provide a mechanical electric motor synchronizer allowing a robot to be taught its maneuvers from a remote location.

Additional advantages, objects and uses will be apparent from the description to those familiar with the relevant art.

DESCRIPTION OF THE PREFERRED EMBODIMENT

Figure 1:
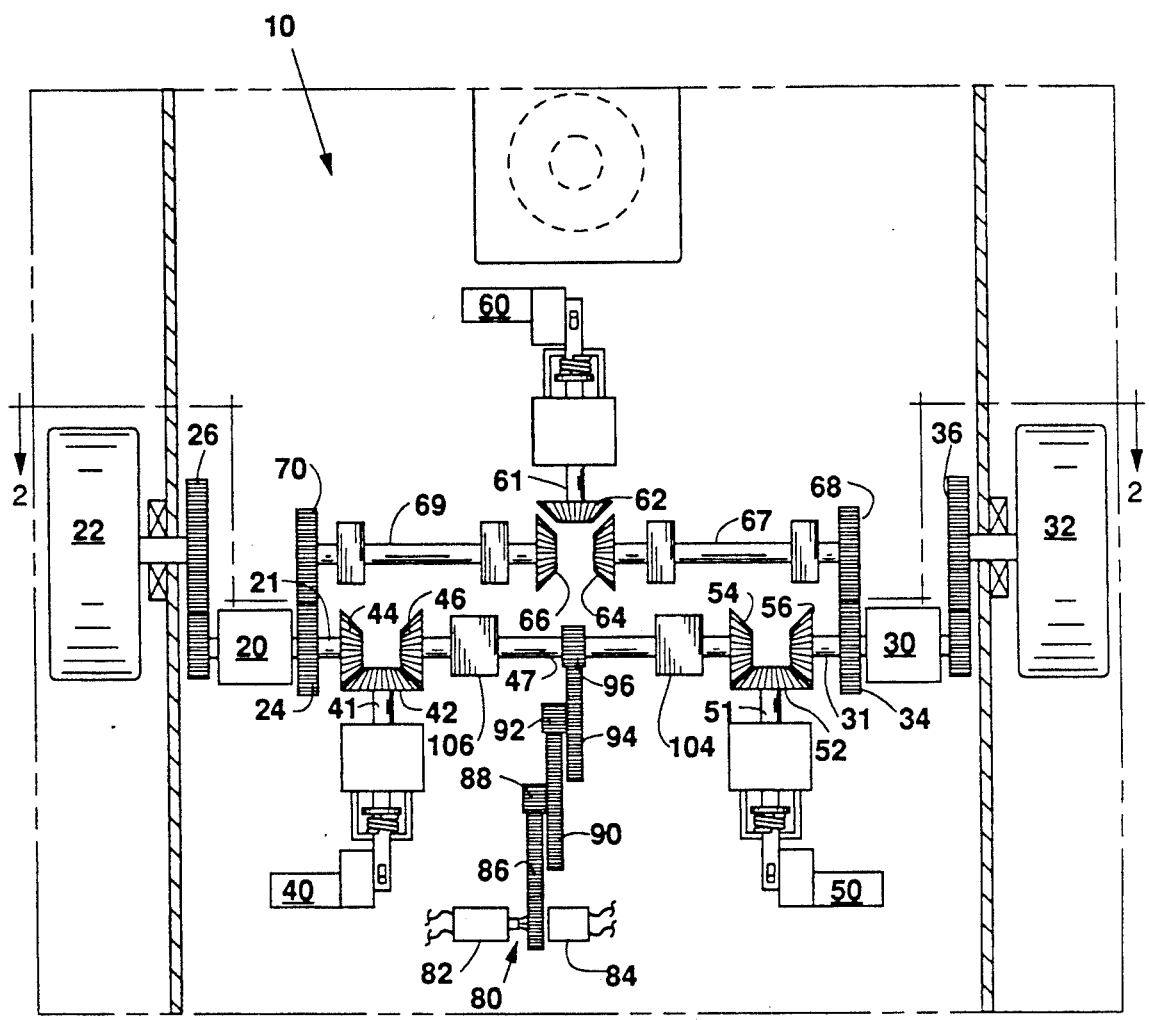
FIG. 1, is a top plane view of one embodiment of a mechanical electric motor synchronizer in accordance with this disclosure.

With reference to FIG. 1, one embodiment of the mechanical electric motor synchronizer 10 according to the present invention includes a pair of electric motors 20 and 30 driving their respective wheels 22 and 32. Sychronized operation of electric motors 20, 30 is accomplished through the servos 40, 50, and 60 with their interconnected multiple bevel gear arrangements.

Electric motors 20, 30 are high torque, medium rpm, direct current electric motors that turn clockwise or counterclockwise according to the polarity of the motor. Voltage inputs adjust the speed of the high torque, medium rpm, DC motors.

Electric motor 20 is connected to wheel 22 through a gear reduction drive mechanism 26 which reduces the high rpm of the electric motor 20 to a range from one wheel revolution per minute to one hundred wheel revolutions per minute, but in the preferred embodiment about twenty-one wheel revolutions per minute of wheel 22.

Electric motor 20 is associated with a first multiple bevel gear set of bevel gears 42, 44, and 46. The output shaft 21 of electric motor 20 has spur gear 24 attached between the electric motor 20 and attached bevel gear 44. As electric motor 20 turns wheel 22 it also rotates bevel gear 44.

Bevel gear 44 is engaged and disengaged with electric motor 30 and wheel 32 by servo 40. Although the preferred embodiment uses servos it is also possible to use several other engagement devices including, but not limited to, solenoids. Servos are preferred because they can be easily controlled remotely by an operator through an onboard receiver (not shown for clarity).

Output shaft 41 of servo 40 has bevel gear 42 attached in a straight running operation. Bevel gear 42 is engaged and disengaged with bevel gear 44 by servo 40 moving output shaft 41 in and out. Bevel gear 42 is also engaged and disengaged with electric motor 30 through bevel gear 46. Bevel gear 46 is attached to shaft 47 which has bevel gear 54 attached on its opposite end.

The right electric motor arrangement is reversed of the left electric motor arrangement. Electric motor 30 is associated with a second multiple bevel gear set of bevel gears 52, 54, and 56. The output shaft 31 of electric motor 30 has spur gear 34 attached between the electric motor 30 and attached bevel gear 56. As electric motor 30 turns wheel 32 it also rotates bevel gear 56.

Bevel gear 56 becomes engaged and disengaged with bevel gear 52 by servo 50 moving its output shaft 51 in and out. Bevel gear 52 is also engaged and disengaged with electric motor 20 through bevel gear 54.

In straight running operation, the first multiple bevel gear set is interconnected with the second multiple bevel gear set. Interconnection occurs with bevel gear 52 being engaged with bevel gears 54, 56 and bevel gear 42 being engaged with its associated bevel gears 44, 46. Interconnection of the multiple bevel gear sets crossconnects electric motor 20 with electric motor 30 which ensures that each motor operates at the same exact rpm.

The third multiple bevel gear set can be engaged with electric motors 20, 30 through spur gears 68, 70. Spur gear 34 is engaged with spur gear 68 which is connected to bevel gear 64 through shaft 67. Servo 60 with shaft 61 and bevel gear 62 is disengaged with bevel gear 64 and bevel gear 66. Bevel gear 66 is joined with spur gear 70 through shaft 69. Spur gear 70 is engaged with spur gear 24 of electric motor 20.

The number of wheel revolutions is monitored through shaft encoder 80. Shaft encoder 80 has an infrared LED emitter 82 and an infrared detector 84. The shaft encoder can have any amount of reduction in gears to get the proper gear ratio. In the preferred embodiment six gears are used. Main shaft coupler gear 96 is engaged with spur gear 94. Spur gear 94 rotates pinon gear 92 which drives spur gear 90. Spur gear 90 drives pinon gear 88 which in turn drives spur gear 86. The actual operation of the shaft encoder 80 is better demonstrated in FIG. 5.

Figure 5:
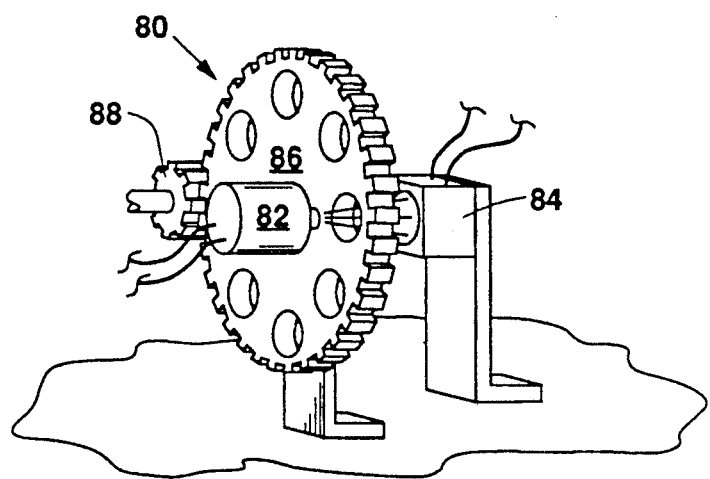
FIG. 5, is a perspective view of the shaft encoder.

As can be seen in FIG. 5 infrared LED emitter 82 transmits an infrared signal to infrared detector 84. Encoder disk gear 86 has evenly spaced holes and as it rotates the light is alternately interrupted and uninterrupted. The infrared detector 84 detects the light interruption and uninterruption as on and off and counts each on and off as one. The on indicator of infrared detector 84 occurs when the light shows through disk gear 86 and is received by the infrared detector 84. When the encoder gear 86 breaks the light source the infrared detector 84 is in the off position, but still counts one. The counting of the light both on and off gives a higher resolution and degree of accuracy of movement, than if only the light on occurrences were counted.

FIG. 1 shows the controller 10 at the at-rest position and straight running operation position. Specifically, bevel gear 42 and bevel gear 52 are engaged with their respective adjoining bevel gears. Bevel gear 62 is disengaged from bevel gears 64 and 66. In this arrangement, the robot can move forward or backward in a straight line. The revolution of wheel 22 and wheel 32 are identically matched. For the robot to move forward electric motor 30 will turn in the clockwise rotation and electric motor 20 will turn counterclockwise. The odd number of gearing arrangements allows the two motors to be interconnected without each motor fighting the other. Since there is direct mechanical linkage it is impossible for one motor to go faster than the other, and thus the revolutions per minute of wheels 32 and 22 are identical to ensure straight line movement forward or backward.

Figure 2:
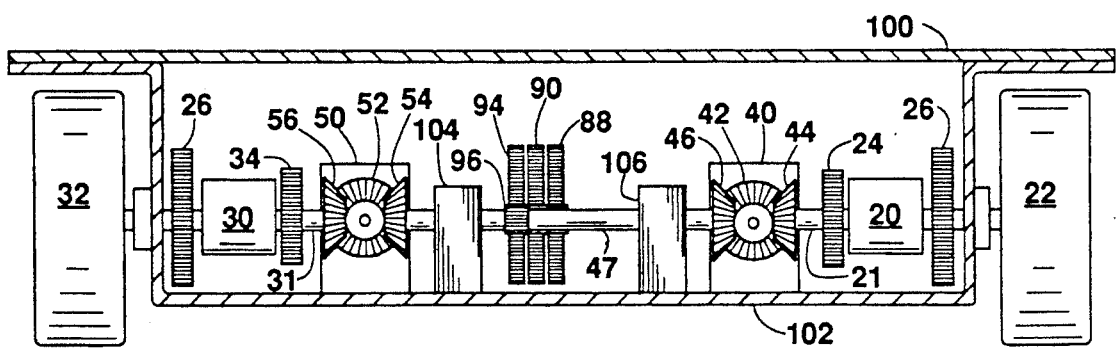
FIG. 2, is a cross-sectional view of FIG. 1.

FIG. 2 illustrates base plate 100 and protective plate 102. Protective plate 102 ensures that the controller 10 is safely stored and can be sealed to protected it from environmental dangers. FIG. 2 also shows that shaft 96 is supported by shaft supports 104 and 106.

Figure 3:
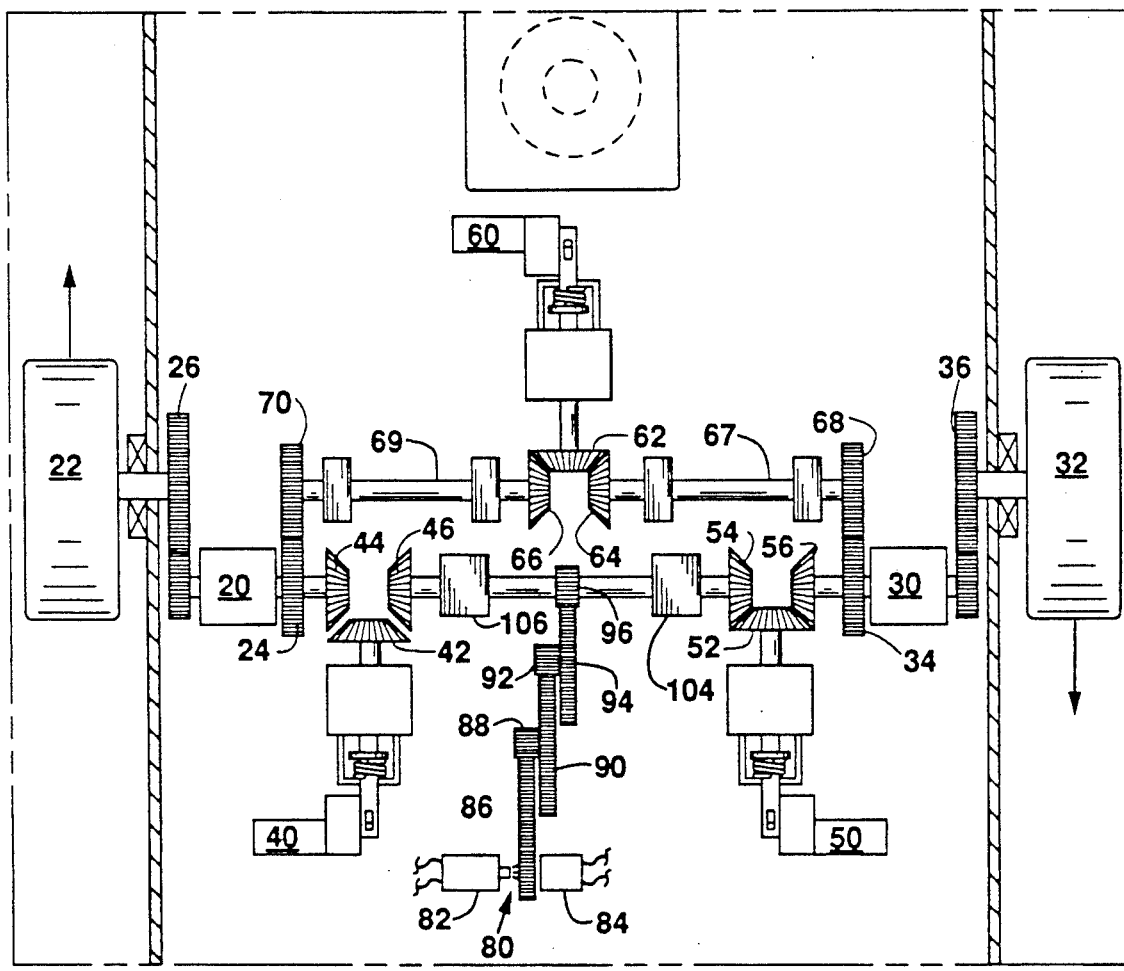
FIG. 3, is a top plane view of the preferred embodiment demonstrating a pivot.

With reference to FIG. 3 the arrangement for the controller 10 to pivot is shown. Pivoting requires one wheel to move forward and the other wheel to move backwards. For a clockwise pivot, electric motor 30 will turn wheel 32 counterclockwise. The second multiple bevel gear set is engaged as bevel gear 52 is engaged with bevel gears 56 and 54 to ensure that shaft encoder 80 is operational. The first multiple bevel gear set is disengaged as bevel gear 42 is disengaged from bevel gears 44 and 46 allowing electric motor 20 to turn wheel 22 in a clockwise rotation when viewed from wheel 32.

The third multiple bevel gear set is engaged as bevel gear 62 is engaged with bevel gears 64 and 66. Spur gear 34 turns spur gear 68 in a clockwise rotation which in turn turns bevel gear 64 is a clockwise rotation. Bevel gear 64 turns bevel gear 62 in a clockwise rotation which in turn turns bevel gear 66 in a counterclockwise rotation. Shaft 69 transmits this counterclockwise rotation to spur gear 70 which turns the spur gear 24 in clockwise rotation. Thus, wheel 32 turns in a counterclockwise rotation and wheel 22 turns in a clockwise rotation with electric motor 20 and electric motor 30 directly linked to ensure that the speed of the wheels 32, 22 is equal. Shaft encoder 80 maintains count of the revolutions per minute of wheel 32.

Figure 4:
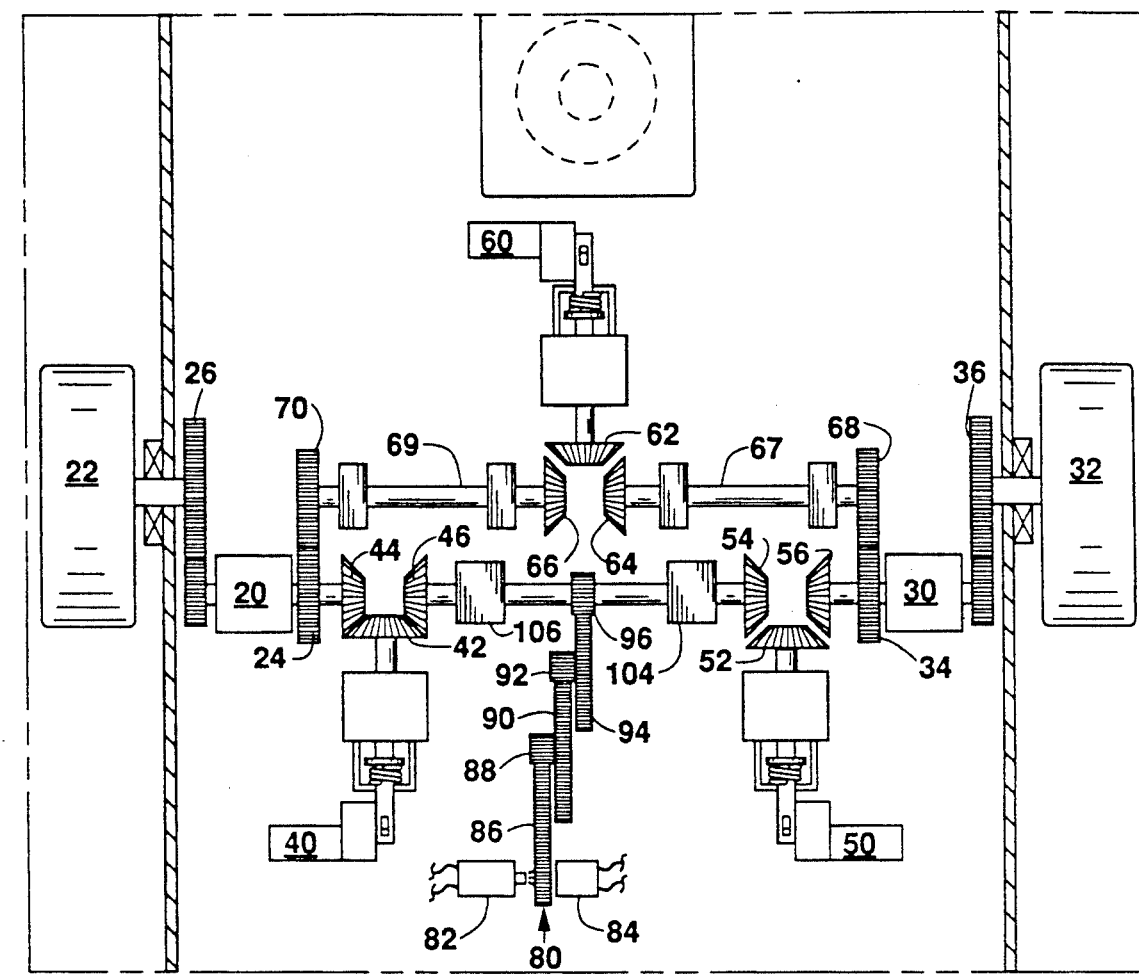
FIG. 4, is a top plane view of the preferred embodiment demonstrating a turn.

With reference to FIG. 4 the controller 10 is shown in the proper arrangement for turning. For a turn the third multiple bevel gear set is disengaged. Either the first multiple bevel gear set or the second multiple bevel gear set will be engaged depending upon which direction of turn is desired. The multiple bevel gear set opposite the direction of turn will be engaged. For example, if a forward right hand turn is desired, bevel gear 42 will be engaged with bevel gears 44 and 46. In this configuration wheel 22 is allowed to rotate in a clockwise direction when viewed from wheel 32 while ensuring that the shaft encoder 80 is operational. Electric motor 30 is stopped.

If desired, a backwards right turn could be accomplished with electric motor 20 turning wheel 22 in a counterclockwise rotation when viewed from wheel 32. If a turn in the opposite direction was desired then bevel gear 42 would be disengaged and bevel gear 52 would be engaged.

Although the invention has been described with reference to specific embodiments, this description is not meant to be construed in a limiting sense. Varying modifications of disclosed embodiments, as well as alternative embodiments of the invention, will become apparent to the person skilled in the art upon reference to the description of the invention. It is, therefore, contemplated that the appended claims will cover such modifications that fall within the true scope of the invention.

I claim:

1. A mechanical synchronizer controller for synchronizing a first motor with attached first wheel and a second motor with attached second wheel comprising:
   a first multiple bevel gear set adapted to be coupled to said first motor with attached first wheel comprising;
      a drive bevel gear aligned with a driven bevel gear;
      an engaging bevel gear adjacent to said drive bevel gear and said driven bevel gear; and
      means for engaging and disengaging said engaging bevel gear with said drive bevel gear and said driven bevel gear;
   a second multiple bevel gear set adapted to be coupled to said second motor with attached second wheel comprising;
      a drive bevel gear aligned with a driven bevel gear;
      an engaging bevel gear adjacent to said drive bevel gear and said driven bevel gear; and
      means for engaging and disengaging said engaging bevel gear with said drive bevel gear and said driven bevel gear; and
   shaft means for coupling said first multiple bevel gear set with said second multiple gear set
   whereby said first wheel is mechanically interlocked with said second wheel ensuring that the revolutions of said first wheel is equal to said second wheel.

2. The mechanical controller of claim 1 further comprising:
   a third multiple bevel gear set for interconnecting said first motor with said second motor comprising;
      a drive bevel gear aligned with a driven bevel gear;
      an engaging bevel gear adjacent to said drive bevel gear and said driven bevel gear; and
      means for engaging and disengaging said engaging bevel gear with said drive bevel gear and said driven bevel gear
   whereby engagement of said third multiple bevel gear set, engagement of said second multiple bevel gear set, and disengagement of said first multiple bevel gear set enables said first wheel to rotate in a different direction than said second wheel.

3. The mechanical controller of claim 1 having means for counting revolutions of said shaft means.

4. The mechanical controller of claim 3 wherein said counting means comprises:
   an infrared light emitting diode emitter for transmitting an infrared signal;
   an encoder disk gear having equally spaced holes for alternately blocking and permitting passage of said infrared signal as said encoder disk gear rotates;
   an infrared detector for receiving said infrared signal and counting each reception and nonreception of said infrared signal; and
   means for reducing the speed of revolutions of said first electric motor and said second electric motor and translating said reduced speed to said encoder disk gear.

* * * * *